Jan. 9, 1962  B. I. ULINSKI  3,015,838
CASTER CONSTRUCTION
Filed May 12, 1960  2 Sheets-Sheet 1
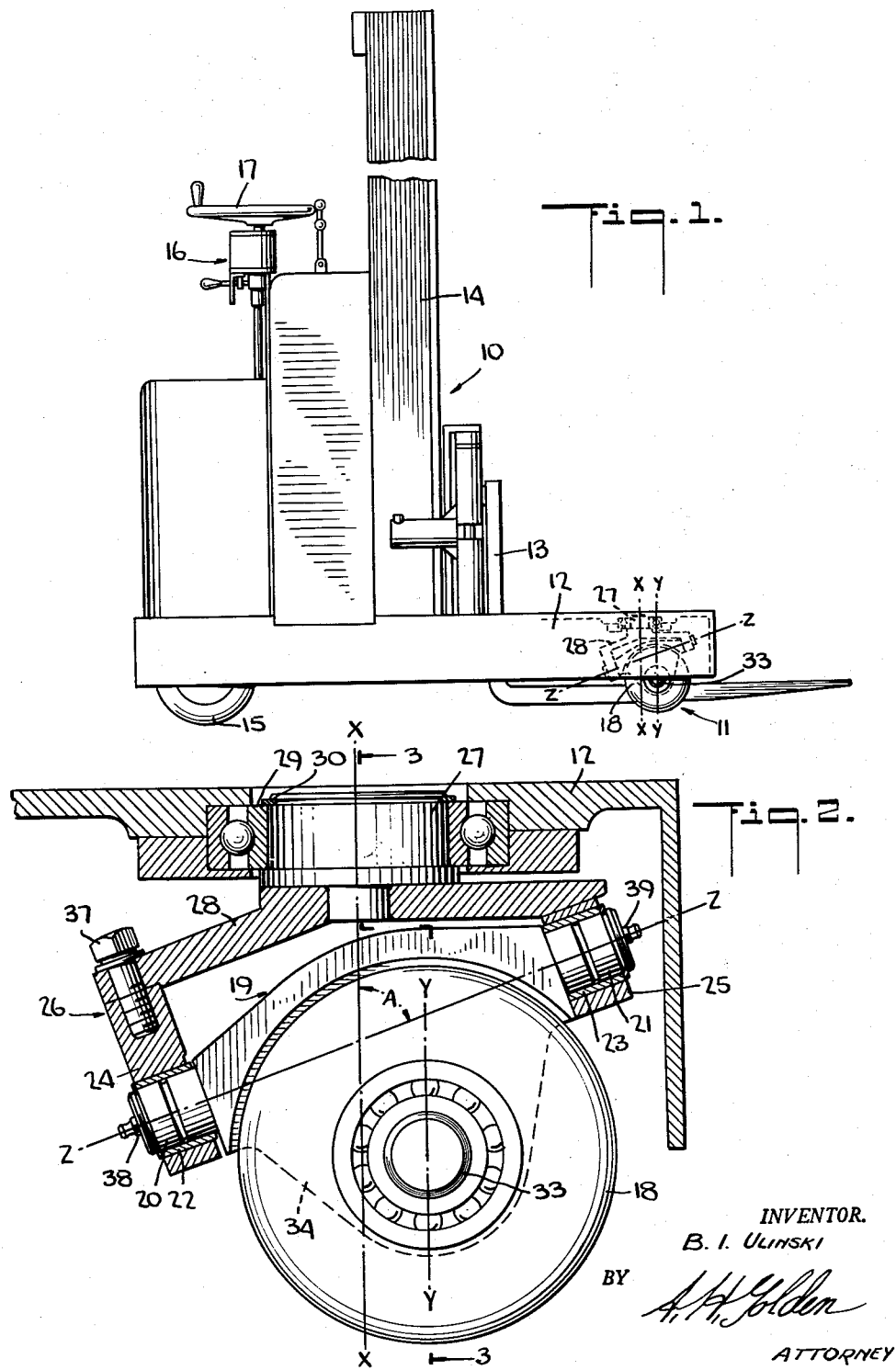
INVENTOR.
B. I. ULINSKI
BY
A. H. Golden
ATTORNEY Jan. 9, 1962  B. I. ULINSKI  3,015,838
CASTER CONSTRUCTION
Filed May 12, 1960  2 Sheets-Sheet 2
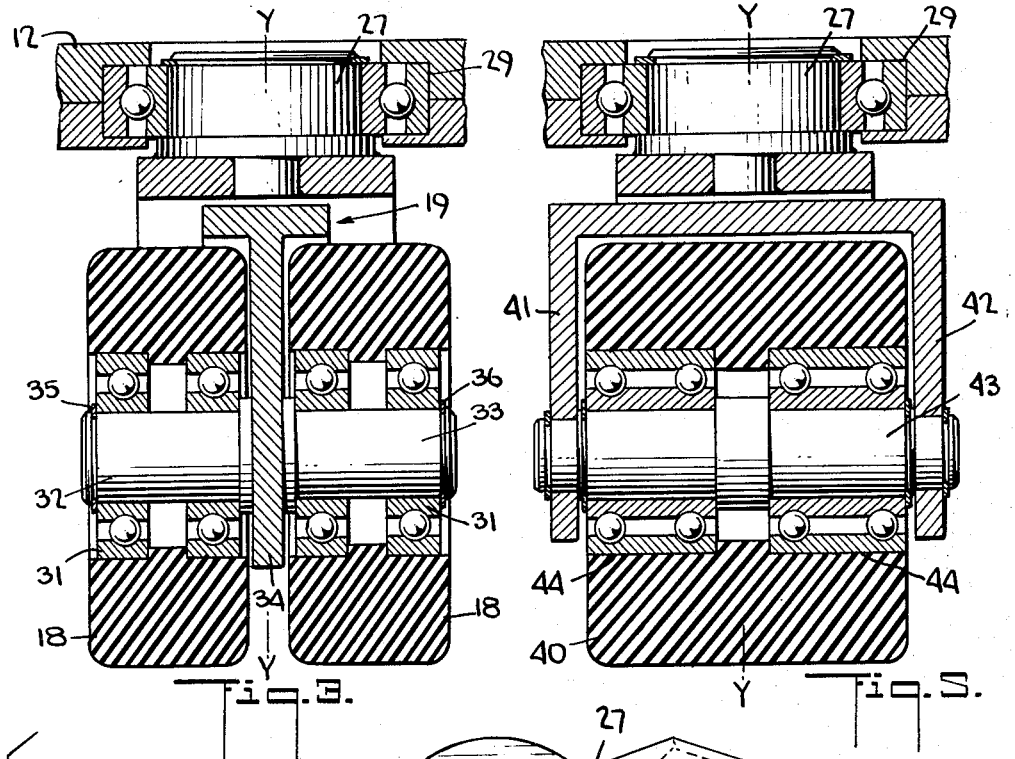
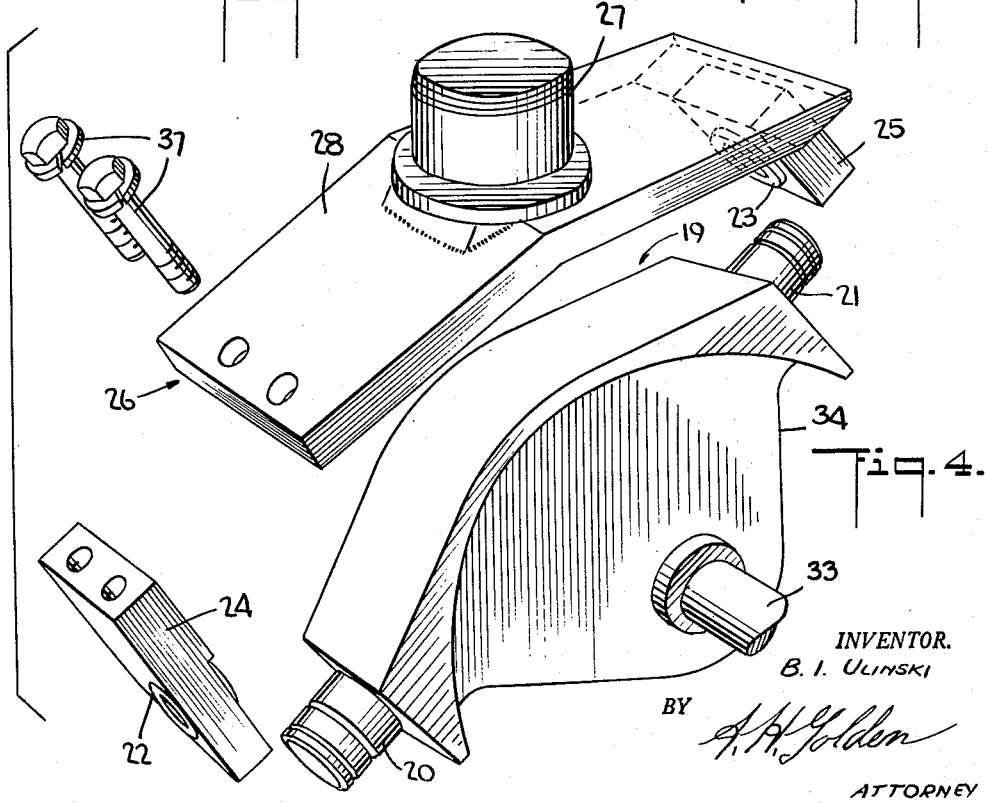
INVENTOR.
B. I. ULINSKI
BY
ATTORNEY United States Patent Office 3,015,838
Patented Jan. 9, 1962

3,015,838
CASTER CONSTRUCTION
Bronislaus I. Ulinski, Flossmoor, Ill., assignor to The Yale & Towne Manufacturing Company, Stamford, Conn., a corporation of Connecticut
Filed May 12, 1960, Ser. No. 28,747
4 Claims. (Cl. 16—21)

This invention relates to industrial trucks, and more particularly to a caster wheel unit for a powered industrial truck.

Powered industrial trucks commonly incorporate one or more caster wheels as supporting wheels for cooperation with powered traction wheels. This is because caster wheels are self-steering, i.e., will swing into the proper direction in accordance with changes in the direction of movement of the truck determined by the steering apparatus of the truck.

While caster wheels do have this self-steering advantage, caster wheels as first used on an industrial truck had the disadvantage that if the truck were steered very sharply, the frictional resistance to turning between the caster wheels and the floor or ground was often so great that in many instances the truck would actually stall, or the tires would be sheared from the caster wheels.

It was subsequently found that this frictional resistance could be reduced and the castering action of the caster wheels therefore improved, if the wheels in addition to being mounted for swivel or castering movement were also mounted for tilting movement about a horizontal axis perpendicular to the vertical caster axis and parallel to the plane of rotation of the wheels so that they would tilt to reduce the area of contact with the ground when the truck was turned sharply. Caster wheel units of such a construction are shown in U.S. Patent No. 2,753,946 and U.S. Patent No. 2,793,875. Until the present invention such caster wheel constructions were considered to provide the best possible castering action.

In accordance with the present invention it has been very surprisingly found that the castering action may be substantially further improved if instead of mounting the caster wheels for tilting movement about a horizontal axis perpendicular to the caster axis, the caster wheels are mounted for tilting movement about an axis which is inclined toward the vertical caster axis. It has been further found that this arrangement provides for self-return of the caster wheels to their vertical position after being tilted without the necessity of providing springs for this purpose.

The invention and its advantages having been broadly described, a more detailed description of an embodiment of the invention is given hereafter by reference to the accompanying drawings, wherein:

FIG. 1 is a side elevational view of an industrial truck incorporating a caster wheel unit constructed in accordance with the present invention, FIG. 2 is an enlarged sectional view of one of the caster wheel units of the truck shown in FIG. 1, to show the details of construction of the caster wheel unit, FIG. 3 is a sectional view taken on the line 3—3 of FIG. 2, FIG. 4 is an exploded, perspective view of the mounting structure of the caster wheel as shown in FIG. 1, and FIG. 5 is a sectional view similar to that of FIG. 3, but showing the invention applied to a single wheel caster wheel unit.

Referring to the drawings, and in particular to FIG. 1, there is shown a truck 10 incorporating a caster unit 11 constructed in accordance with the invention.

The particular truck illustrated in FIG. 1 is of the type disclosed in my co-pending application, Serial No. 829,111, filed July 23, 1959. While the caster unit of the invention is described hereafter in conjunction with such a truck, it will be appreciated that this is for the purpose of illustration and that the caster unit may be used on other types and styles of industrial trucks. It is sufficient, therefore, to point out that the truck 10 is of the straddle type having a pair of laterally spaced legs 12, only one of which can be seen in FIG. 1. Lifting forks 13 are mounted for vertical movement on a mast structure 14, and are adapted to be moved against the ground between the straddle legs 12 to engage or deposit a load.

The truck 10 is supported at its forward end by caster units 11 carried adjacent the outer end of each leg 12, and is supported at the rear end by a pair of steerable driving wheels 15, only one of which can be seen in FIG. 1, the other being positioned on the transversely opposite side of the truck. The truck is adapted to be steered by operating the driving wheels 15 at different speeds or different directions by means of suitable controls 16, and also by turning of the wheels 15 by means of a steering wheel 17.

It will be appreciated that as the truck 10 is steered by the wheels 15, the caster units 11 will swing relatively to the truck about a vertical caster axis X—X by reason of the frictional force between the caster wheels 18 of the caster units 11 and the ground acting transversely against the wheel treads at a point laterally spaced from the axis X—X. It will also be appreciated that in pivoting relatively to the truck, the caster wheels 18 must pivot relative to the ground about a vertical axis Y—Y which extends through the axis of rotation of the caster wheels 18 and that, therefore, there is resulting frictional resistance between the wheels 18 and the ground tending to resist this rotation of the wheels 18 about the axis Y—Y which interferes with the movement of the truck when the truck is steered sharply. The novel caster construction of the present invention minimizes this resistance to turning of the caster wheels when the truck is rapidly and sharply turned thereby improving the steering or castering action of the caster wheels.

This is accomplished in accordance with the invention by mounting the caster wheels 18 for tilting movement about an axis Z—Z which is inclined at an angle to the vertical caster axis X—X and is parallel to the plane of rotation of the caster wheels 18.

As best shown in FIGS. 2 and 3, the caster wheels 18 are conveniently mounted for such tilting movement by means of a wheel support 19 which has integral shaft portions 20 and 21 at opposite ends thereof which are suitably journaled in bearings 22 and 23 carried in opposed arms 24 and 25 of a fork member 26. The fork member 26 in turn has a vertical shaft portion 27 which is welded or otherwise rigidly secured to a top plate member 28, and extends through a thrust bearing 29 carried by the leg 12 of the truck 10 so that the fork member 26, the wheel support 19 and the wheels 18 may pivot or swivel around the vertical caster axis X—X. The shaft portion 27 is conveniently secured against downward endwise movement out of the bearing 29 by means of a split ring retainer 30. In accordance with usual practice in caster construction, the axis of rotation of the wheels 18 is spaced laterally from the caster axis X—X, as indicated by the space between the axis X—X and the axis Y—Y, to permit the castering action. It will be appreciated that the mounting as described permits relative castering movement between the wheels 18 and the truck about the caster axis X—X and also permits tilting movement of the wheels 18 about the inclined axis Z—Z which is parallel to the plane of rotation of the wheels 18 and is inclined toward the caster axis X—X.

As best shown in FIG. 3, when a dual caster wheel unit is used the wheels 18 are conveniently supported for rotation on the wheel support 19 by means of bearings 31 which are mounted on stub shafts 32 and 33 which are secured to and extend from opposite sides of a vertical web member 34 of the wheel support 19. The wheels 18 are held on the stub shafts 32 and 33 by means of suitable split ring retainers 35 and 36.

As best shown in FIG. 4, the arm 24 of the fork member 26 is preferably detachably secured to the top plate 28 by means of bolts 37 so that the wheel support 19 may be easily assembled and disassembled from the fork member 26. Referring also to FIG. 2, it can be seen that the desired incline of the axis Z—Z is conveniently obtained by making the arm 24 longer than the arm 25 and bending the top plate 28 downwardly from the horizontal. Extremely good results have been obtained if the fork member is so formed that the angle between the caster axis X—X and the tilting axis Z—Z, as indicated by the dimension A in FIG. 2, is approximately 70 degrees, or expressed in another manner, that the axis Z—Z extends at approximately 20 degrees to the horizontal.

As shown in FIG. 2, the shaft portions 20 and 21 of the wheel support 19 may be provided with suitable grease fittings 38 and 39 to facilitate lubrication of the bearings 22 and 23.

While the invention has been described in connection with a dual wheel caster unit as shown in FIG. 3, it will be appreciated that the invention is equally applicable to a caster unit incorporating a single wheel as indicated at 40 in FIG. 5. In such a unit, the web portion 34 as used in the dual wheel unit is replaced by laterally spaced flanges 41 and 42 which carry a single axle 43 on which the wheel is mounted by suitable bearings 44.

It will be appreciated that whether the dual wheel unit of FIG. 3 or the single wheel unit of FIG. 5 is used, the wheels will tilt about the axis Z—Z when the truck is sharply turned because of the frictional force acting transversely against the wheel. When this force is subsequently relieved as the caster wheel or wheels move into proper steering direction, the weight of the truck will return the wheel or wheels to vertical position.

From the preceding description it can be seen that there is provided a very novel caster wheel construction in which the caster wheel is not only mounted for rotation about a vertical caster axis but is also mounted for tilting movement about an axis inclined toward the caster axis. It has been found that by this construction a very considerable improvement in the castering action is obtained with resulting improvement in the ease of handling of the truck. While certain embodiments of the invention have been shown and described, it will be appreciated that these are for the purpose of illustration and that changes and modifications can be made without departing from the spirit and scope of the invention.

I now claim:

1. In an industrial truck, a caster unit comprising, a mounting member, means mounting said mounting member on said truck for rotation about a substantially vertical caster axis, a caster wheel supporting the truck through said mounting member, and means mounting said caster wheel on said mounting member for tilting movement about an axis inclined toward said vertical axis and parallel to the plane of rotation of said caster wheel with the axis of rotation of said caster wheel offset laterally from said vertical caster axis while the truck is supported on the caster wheel.

2. In an industrial truck, a caster unit comprising, a mounting member, means mounting said mounting member on said truck for rotation about a substantially vertical caster axis, a wheel support, a caster wheel mounted for rotation on said wheel support with the axis of rotation of said caster wheel offset laterally from said vertical caster axis and said caster wheel supporting said truck through said wheel support and mounting member, and means mounting said wheel support on said mounting member for tilting movement about an axis inclined toward said vertical caster axis and parallel to the plane of rotation of said caster wheel while the truck is supported on the caster wheel.

3. In an industrial truck, a caster wheel unit comprising, a fork member having laterally spaced arms, means mounting said fork member on said truck for rotation about a substantially vertical caster axis with the arms of the fork extending downwardly, a wheel support, a caster wheel rotatably mounted on said wheel support with the axis of rotation of said caster wheel offset laterally from said vertical caster axis and said caster wheel supporting said truck through said wheel support and mounting member, and means rotatably supporting opposed ends of said wheel support on said arms for tilting movement of said wheel support about an axis inclined toward said vertical caster axis and parallel to the plane of rotation of the caster wheel while the truck is supported on the caster wheel.

4. In an industrial truck, a caster wheel unit comprising, a fork member having laterally spaced arms, means mounting said fork member on said truck for rotation about a substantially vertical caster axis with the arms of the fork extending downwardly, a wheel support, a caster wheel rotatably mounted on said wheel support with the axis of rotation of said caster wheel offset laterally from said vertical caster axis and said caster wheel supporting said truck through said wheel support and mounting member, shaft means extending from opposite ends of said wheel support and journaled for rotation in said spaced arms of said mounting member with one end of said wheel support higher than the other end whereby said wheel support and said caster wheel rotatably supported thereon may tilt about an axis which is inclined toward said vertical caster axis and parallel to the plane of rotation of the caster wheel while the truck is supported on the caster wheel.

References Cited in the file of this patent

UNITED STATES PATENTS

| | | |
|---|---|---|
| 348,052 | Pleukharp | Aug. 24, 1886 |
| 632,166 | Berninghaus et al. | Aug. 29, 1899 |
| 1,194,780 | Pavey et al. | Aug. 15, 1916 |

FOREIGN PATENTS

| | | |
|---|---|---|
| 26,753 | Great Britain | Dec. 19, 1898 |